United States Patent [19]

Rider

[11] 4,320,420
[45] Mar. 16, 1982

[54] HYBRID BIT CLOCK SERVO

[75] Inventor: Ronald E. Rider, Palos Verdes Estates, Calif.

[73] Assignee: Xerox Corporation, Stamford, Conn.

[21] Appl. No.: 165,813

[22] Filed: Jul. 3, 1980

[51] Int. Cl.³ .............................................. H04N 1/04
[52] U.S. Cl. .................................. 358/267; 358/206; 358/285; 358/293
[58] Field of Search ............... 358/206, 267, 285, 293; 350/6.8, 285

[56] References Cited

U.S. PATENT DOCUMENTS

| | | | |
|---|---|---|---|
| 3,922,485 | 11/1975 | Starkweather | 358/285 |
| 4,040,096 | 8/1977 | Starkweather | 358/206 |
| 4,084,197 | 4/1978 | Starkweather | 358/293 |
| 4,130,838 | 12/1978 | St. John | 358/285 |
| 4,143,403 | 3/1979 | Ohnishi | 358/285 |
| 4,195,316 | 3/1980 | Sansome | 358/285 |

*Primary Examiner*—Howard Britton
*Attorney, Agent, or Firm*—Robert E. Cunha

[57] ABSTRACT

A circuit for controlling the clock rate separately for each facet of a polygon used in a laser driven raster output scanner. The clock rate for facet #0 is servoed using a first order integrator (11) driven by a digital correction circuit which compares the actual number of pulses against the required number, and produces therefrom an analog correction pulse width which is applied to the integrator (11). A second order integrator (19) is used to compensate for leakage of charge from the parallel capacitor of the first order integrator (11), to improve performance. The remaining facets are then corrected for by assigning to each an individual correction voltage. This correction voltage is generated by counting clock pulses for each additional facet and using these pulse totals to generate individual analog correction voltages which are added to, or subtracted from the facet #0 voltage in an adder (18) which combines the facet #0 correction voltage with each individual voltage in sequence. The result is a relatively simple and inexpensive circuit that compensates for facet signature errors, as well as errors produced by drive motor hunting.

11 Claims, 13 Drawing Figures

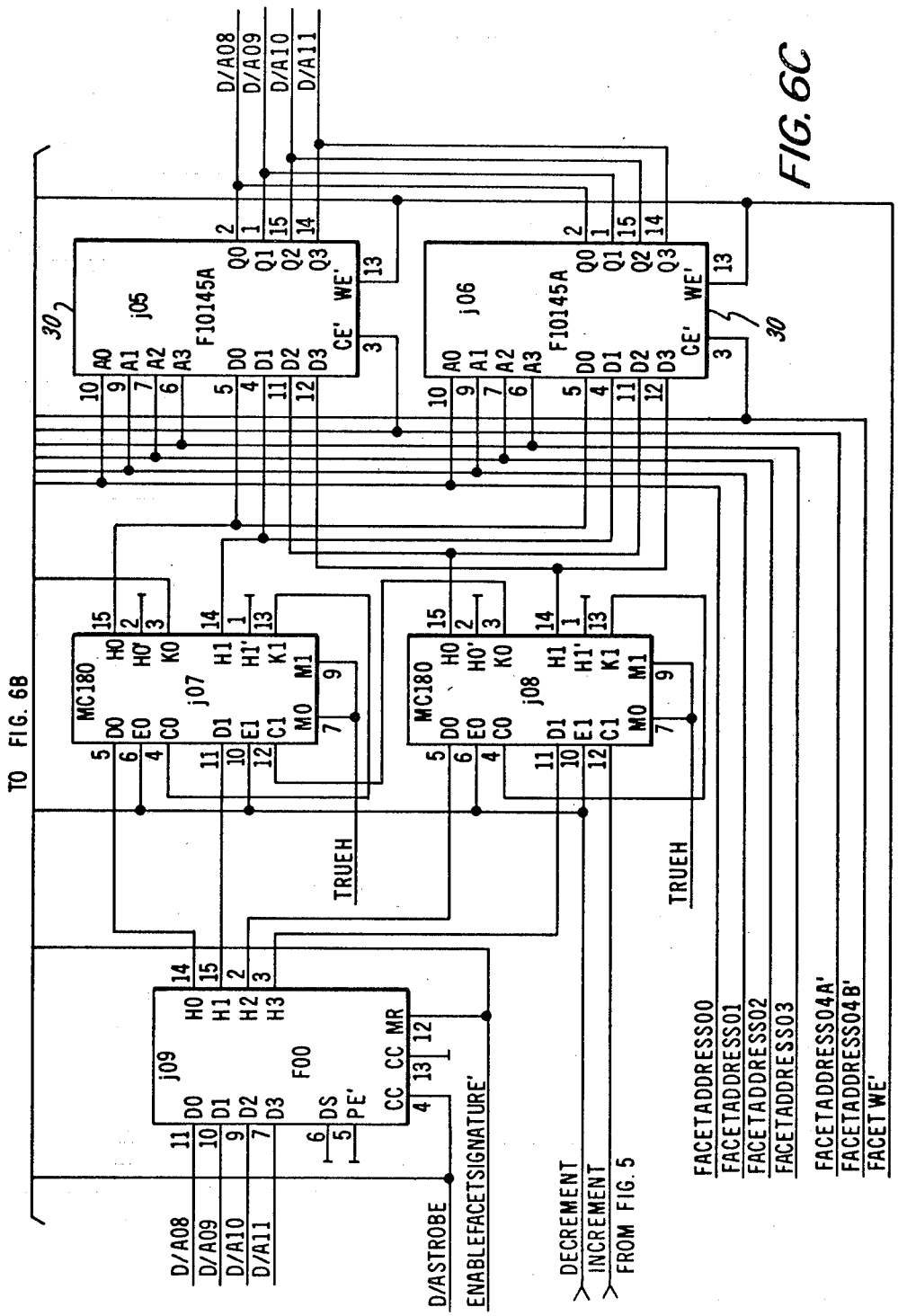

HYBRID BIT CLOCK SERVO

The described circuit and method electronically corrects for polygon facet and drive motor irregularities in a laser driven raster output scanner of a hard copy printer.

In a printer having a raster output scanner, it is typical to use a rotating polygon in a flying spot scanner for scanning a xerographic selenium drum. However, the resultant copy quality is usually impaired to some extent in this type of system because of various imperfections in the polygon and motor.

The most common is "run out error" which is a variation, from one scan to another, in the direction perpendicular to the scan direction caused either by a wobble in the motor shaft or by an incorrectly ground facet angle. This type of error can be taken out either electronically or optically.

An optical solution is shown in U.S. Pat. No. 4,040,096, Flying Spot Scanner with Runout Correction by Gary K. Starkweather. The result of the use of the described optics is that the scan will fall on the proper line regardless of a wide variance in runout tolerance of the scanning system. An electronic solution to the problem would be to use a varying frequency signal to drive an acousto-optical modulator which bends the light beam. In this case, if a particular facet has a known tilt, a predetermined correction factor can be applied to it.

Another common kind of error is an angular error in the direction of scan. One cause of this error may be that the facets are not ground at precisely the correct angles. In this case, a scan line may start at a different point from the previous scan line, either earlier or later than appropriate. The typical correction for this "start of scan" error is to include in the system a start of scan detector at a precise location. Then, when this detector sees the beam pass the start point, it generates a synchronization signal to start the bit clock which measures the bit positions along the page. A patent describing this technique in U.S. Pat. No. 3,922,485, Flying Spot Scanner with Scan Detection, by Gary K. Starkweather. More specifically, FIGS. 3 and 4 of that patent are circuit drawings of scan detectors for controlling the position of the start of each scan.

A simple circuit to perform this function would be a two input NAND gate having one input coupled to the start of scan detector and the other connected through a delay line to the gate output. Then, when the gate is enabled by the start of scan detector output, the gate will produce a synchronized stream of clock pulses.

An alternative is to use a crystal oscillator which runs, for example, at eight times the bit clock frequency. At start of scan, the bit clock is synchronized to one of the eight clock pulses, and thereafter the bit clock is generated from every eighth oscillator pulse. This system has a maximum error which is a fraction of the oscillator bit time, and does not vary over the length of the scan.

These methods are adversely affected by the inevitable variation of motor speed. What is needed is not a stable clock, but a clock that tracks the motor speed irregularities.

Of course, a motor that runs at an absolutely stable frequency would solve the problem, but all motors have slight speed variations. These speed variations are in the range of several cycles per second, and result in a variation of scan line length, assuming a stable clock and a fixed start of scan. One attempted solution is to servo the motor to improve its frequency stability, see Speed Control Apparatus For Scanning System, U.S. Pat. No. 4,130,838, by Robert P. St. John. However, some variations remain.

Better system peformance can be achieved by accepting some motor variation and varying the clock frequency to match it. This can be accomplished by providing the system with an end of scan detector as well as a start of scan detector. Then, the start of scan detector starts a counter which counts clock pulses and the end of scan detector stops the counter. The resultant count will be too high or low if the clock frequency was too high or low, respectively. A correction voltage may then be created and applied to a voltage controlled oscillator (VCO) to correct the clock frequency. A patent describing a system including start of scan and end of scan detectors for synchronizing the scan and video is Flying Spot Scanner with Scan Detection, U.S. Pat. No. 4,084,197 by Gary K. Starkweather, and a description of a circuit which uses these detectors to vary the clock frequency is contained in Adapter for Raster Output Scanning Printer, U.S. Pat. No. 4,279,002, by Ronald E. Rider.

This technique corrects for overall motor speed variations, but there is another class of errors, sometimes called facet signature errors, which occur at specific points in each polygon rotation. These errors may be caused either by slight errors in the facets or by motor irregularities that occur at particular points during rotation. A common polygon problem is that there is a slight difference in radius for each facet.

These facet signature errors result in clock errors of one part in from three to ten thousand, but error rates of one part in fifty thousand are required.

One possible method of correcting for individual facet errors is to provide a correcting circuit for each facet. Of course, this would be expensive. Also, it would be very difficult to tune twelve circuits, one for each polygon, to exactly match each other, and failing that, the circuits themselves would introduce some error.

One reason for circuit inaccuracy is that the control element usually used is an operational amplifier with a parallel integrating capacitor, and the capacitor charge has a tendency to leak off between signal inputs. A second order integrating operational amplifier in parallel with the first, but incorporating a much longer time constant, can be used to correct for this leakage. Of course, a plurality of circuits, each containing two operational amplifiers would be even more expensive.

The optimum solution, which will be described in more detail below, is to use one corrected circuit of the type described above for one facet of the polygon, and simply add an instantaneous correction voltage to the operational amplifier output for each remaining facet. In this case, the long term errors, including motor hunting, are taken out by the basic circuit, and each facet error is corrected by a separately generated analog voltage input.

The result of the use of this particular cifrcuit is a lower cost, both in the circuit itself because of a reduced part count, and in the polygon since a lower cost polygon can be used, while still maintaining superior system performance through the use of electronics to compensate for facet defects.

FIGS. 6A, 6B and 6C are a schematic diagram of the RAM circuit.

Figure 1:
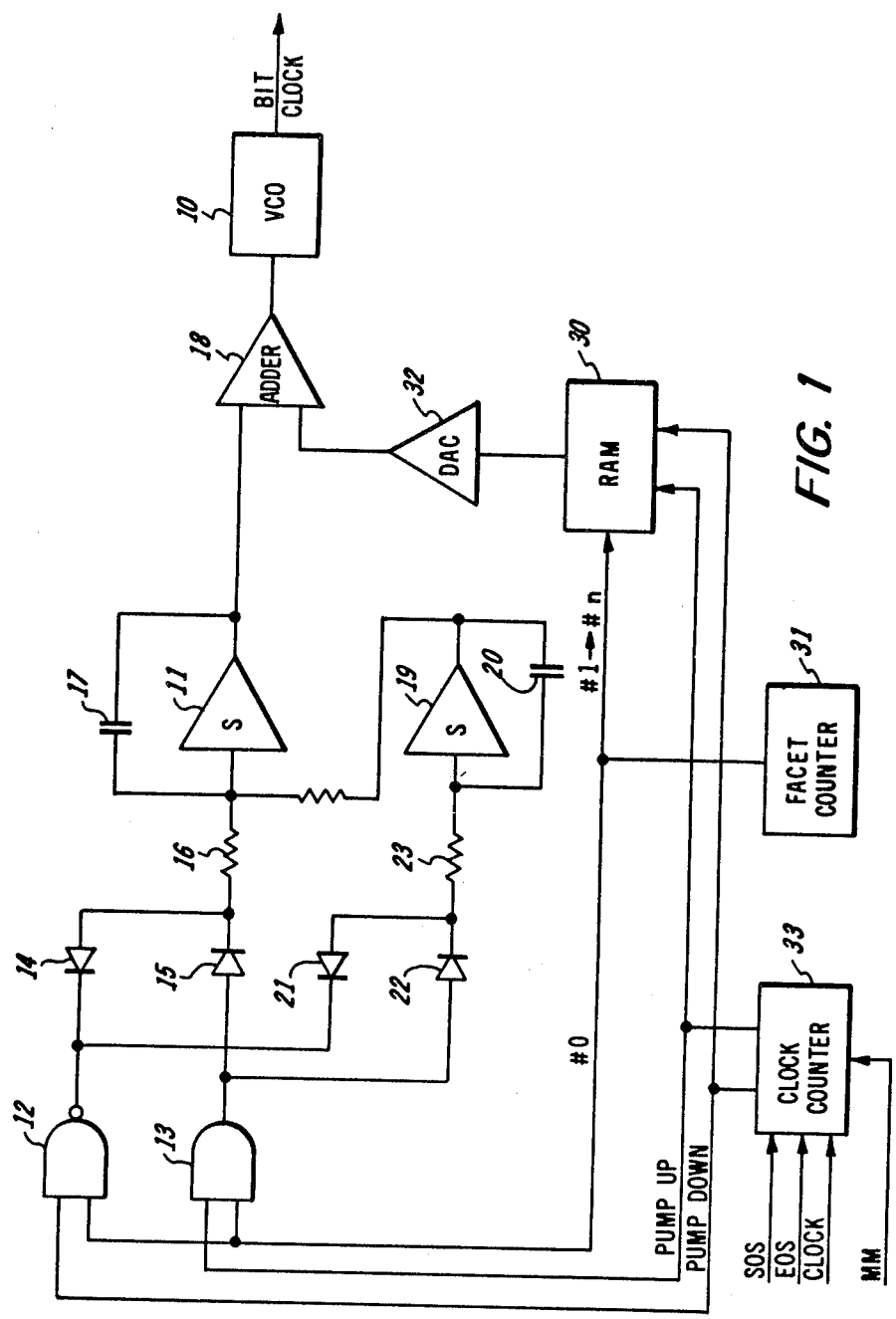
FIG. 1 is an overall block diagram of the system.

The overall block diagram is shown in FIG. 1. A clock counter 33 is started by a start of scan signal (SOS), is stopped by an end of scan signal (EOS), counts the clock pulses during the scan, compares that count to a predetermined number and generates PUMP UP or PUMP DOWN signals, if required. These signals are then coupled through gates 12, 13 and isolation diodes 14, 15 to drive the integrator comprising operational amplifier 11, resistor 16 and capacitor 17. The voltage output is coupled through adder 18 to VCO 10 to correct the clock frequency. In this way, motor speed variations are compensated for. To improve circuit performance, a second order long time constant integrator, operational amplifier 19, resistor 23 and capacitor 20, is driven by the same PUMP UP or PUMP DOWN signals through isolation diodes 21, 22 to supply a correction signal to the signal input lines of operational amplifier 11 to compensate for the small amount of charge that tends to leak off capacitor 17 because of its short time constant.

The individual facets are identified by the facet counter 31 which randomly assigns the number zero to one facet and numbers the remainder successively. Facet number zero is then used thereafter in the clock frequency correction process described above.

The facet signature errors of the remaining facets are corrected as follows. On initializing the system, the RAM 30 locations corresponding to the remaining facets are zeroed so that a zero volt correction voltage is generated by the DAC 32 and added to the basic correction voltage generated by the integrator 11 at adder 18. Thereafter, for each scan the clock counter compares the number of clock pulses during the scan to the same predetermined number used for facet zero and increments (or decrements) the contents of the associated RAM 30 locations if the count was too low (or high). After a few revolutions of the polygon, the RAM will contain a two's complement number for each facet which, when converted to an analog voltage in DAC 32, will produce at the VCO 10 the same number of clocks per scan as is produced for facet zero. Thereafter, since the motor speed is likely to vary slightly while the facet signature errors tend to be fixed, the facet zero correction voltage output will vary to track the motor speed and automatically correct all other facets at the same time.

Figure 2A:
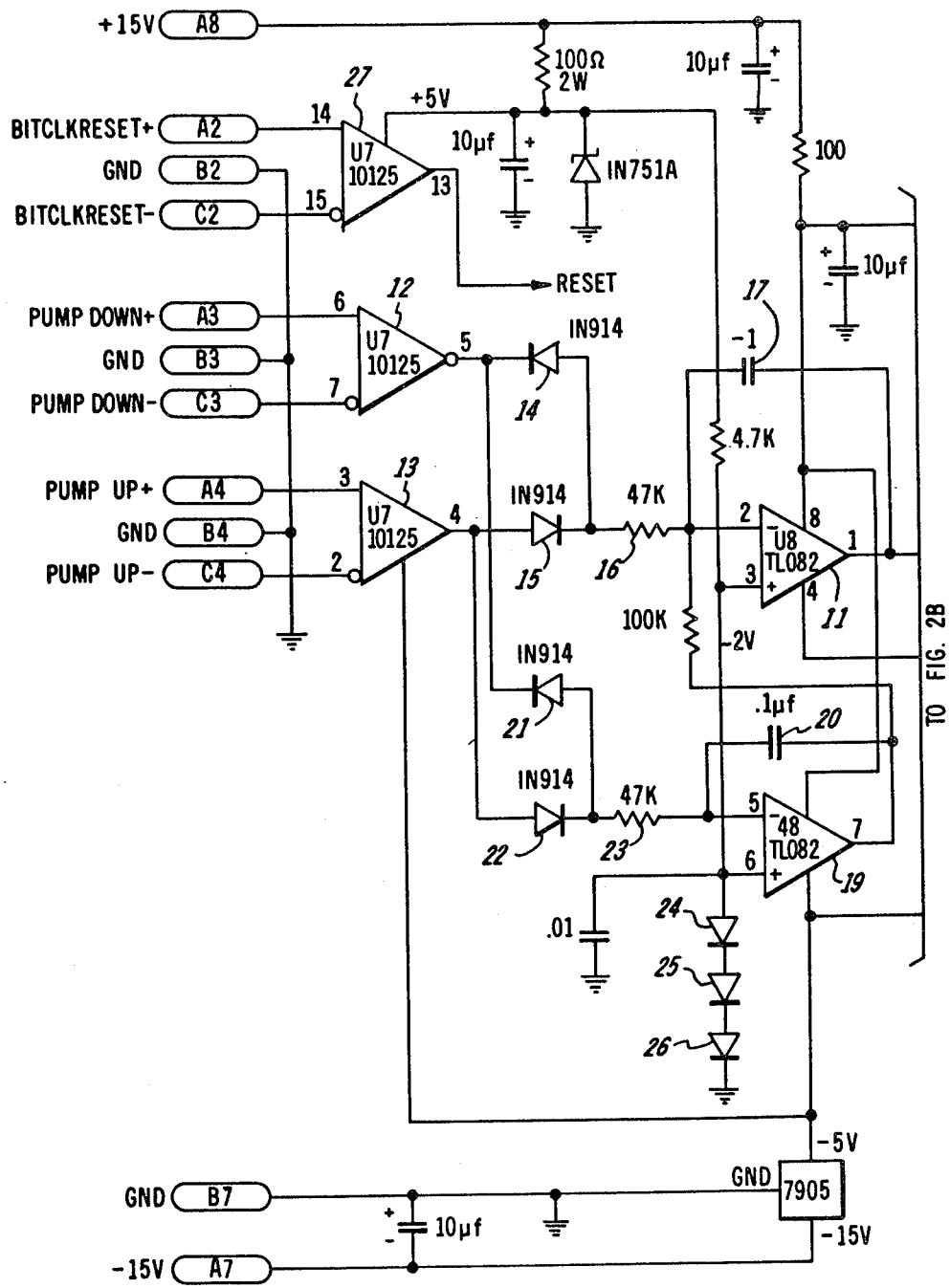
FIGS. 2A and 2B are a schematic diagram of the analog portions of the circuit.
Figure 2B:
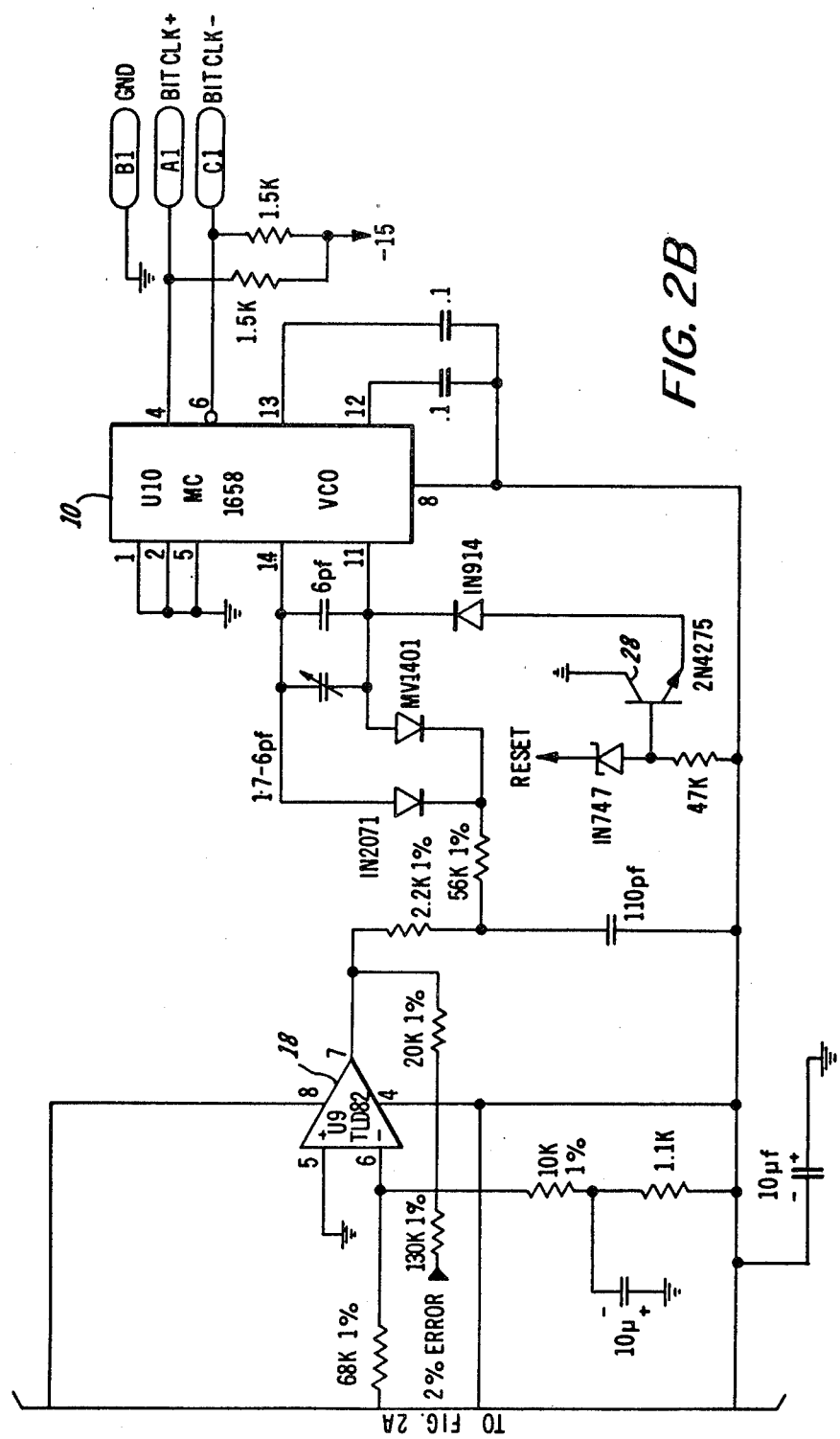

FIG. 2 is the analog portion of the clock pulse generator comprising the VCO 10 and the operational amplifier (op amp) 11 that controls it.

Elsewhere in the circuit a clock pulse counter for facet #0 will count clock pulses occurring between the start and end of scan. This count may be too high or too low, and will result, if necessary, in an input at the PUMP DOWN and PUMP UP inputs to amplifiers 12 and 13. These amplifiers are charge pumps and inject a positive or negative charge through isolation diodes 14, 15 and a resistor 16 to the signal input of the integrating op amp 11 with its integrating capacitor 17. The analog ouput is then coupled through adder 18 to control the frequency of the VCO 10.

The second order integrator comprises op amp 19 and capacitor 20. It receives the same input signals as the integrator 11 through isolation diodes 21, 22 and resistor 23, but the time constant is much longer because of the larger value of capacitor 20, and therefore, this integrator can track the slow change of the motor frequency. The output is coupled to the signal input of op amp 11 to compensate for the charge leakage there caused by the short time constant of that integrator. Diodes 24, 25, 26 create a two volt bias at the op amp 11 reference input, pin 3, so that a range of from zero to four volts can be accepted at the signal input pin 2.

The adder 18, in addition to coupling the signal from op amp 11 to VCO 10, also adds to that signal a corrrection voltage for each facet. This correction voltage is generated in a circuit, described in more detail below, comprising a counter for counting clock pulses for each scan and for incrementing or decrementing a correction factor in a RAM if the count was too high or low, and a DAC for converting each RAM correction factor into a correction voltage for input to the adder 18. The circuit is designed so that a maximum of two percent error for each facet can be accomodated. In this way, op amp 11 tracks the motor frequency and adder 18 corrects for facet "signature" errors.

The start of scan signal is used as the BIT CLK RESET input to amplifier 27 to produce a RESET signal which is coupled through transistor 28 to the VCO 10 as a start signal. Thus the clock pulse generator is started synchronously with the start of scan.

The novelty of this invention over the known prior art is the correction of each facet, through the addition of correction voltages at the adder 18. An additional point of novelty is the combination of the facet signature correction circuit with the leakage correction op amp 19. Without this leakage correction, facet #0 will be offset from the remainder.

Figure 3:
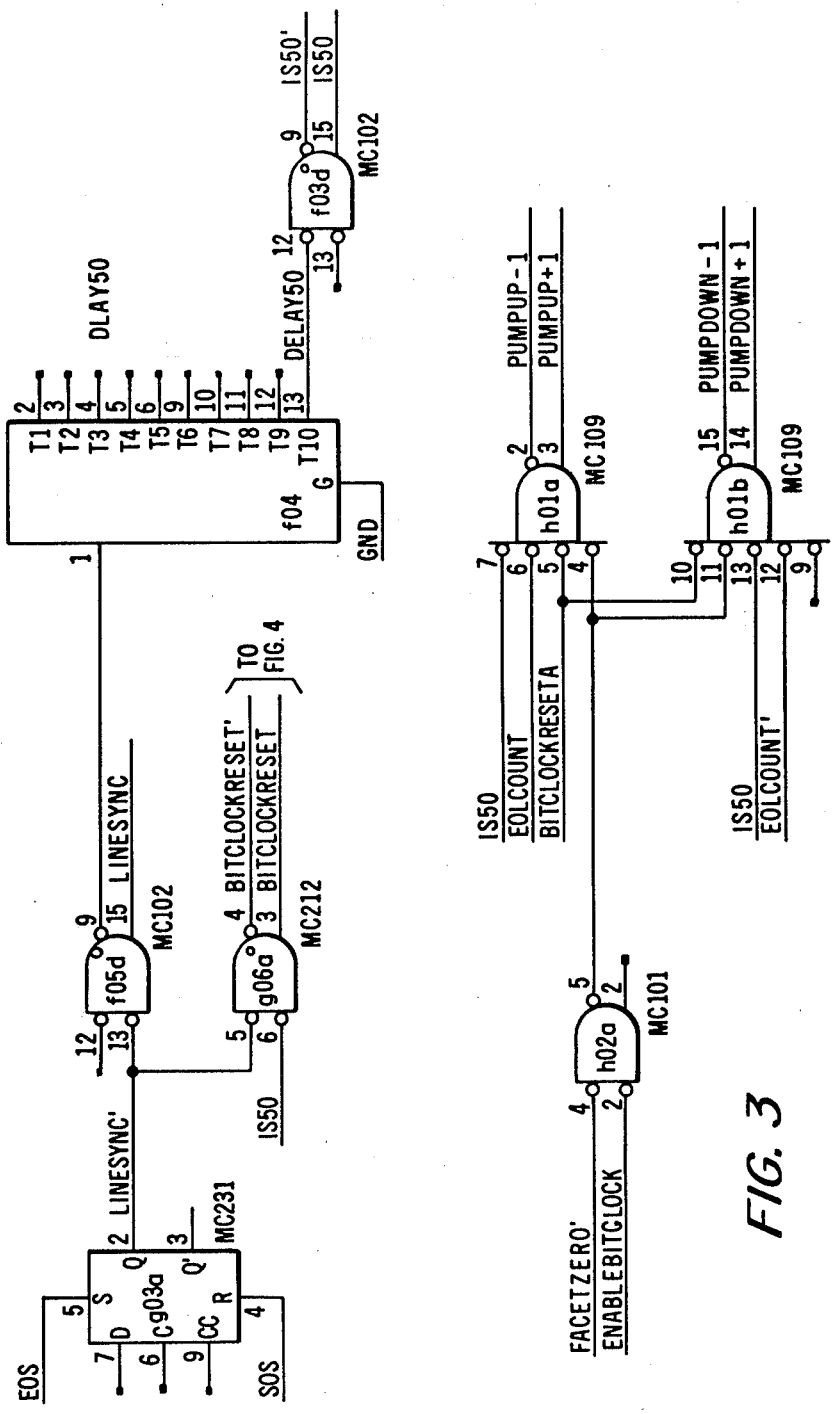
FIG. 3 is a schematic diagram of the circuits used to produce the logic signals for controlling the facet #0 servo circuit.

The remainder of the schematics describe the digital portion of the circuit. In FIG. 3 the start of scan SOS and end of scan EOS drive a flip-flop g03a to produce a reset signal BIT CLOCKRESET and a line synch signal LINESYNC which is delayed fifty nanoseconds to produce a delayed signal 1s50. BITCLOCKRESET is used to stop and start the bit clock VCO 10 of FIG. 1 so that it will run synchronously with the scan.

Figure 4A:
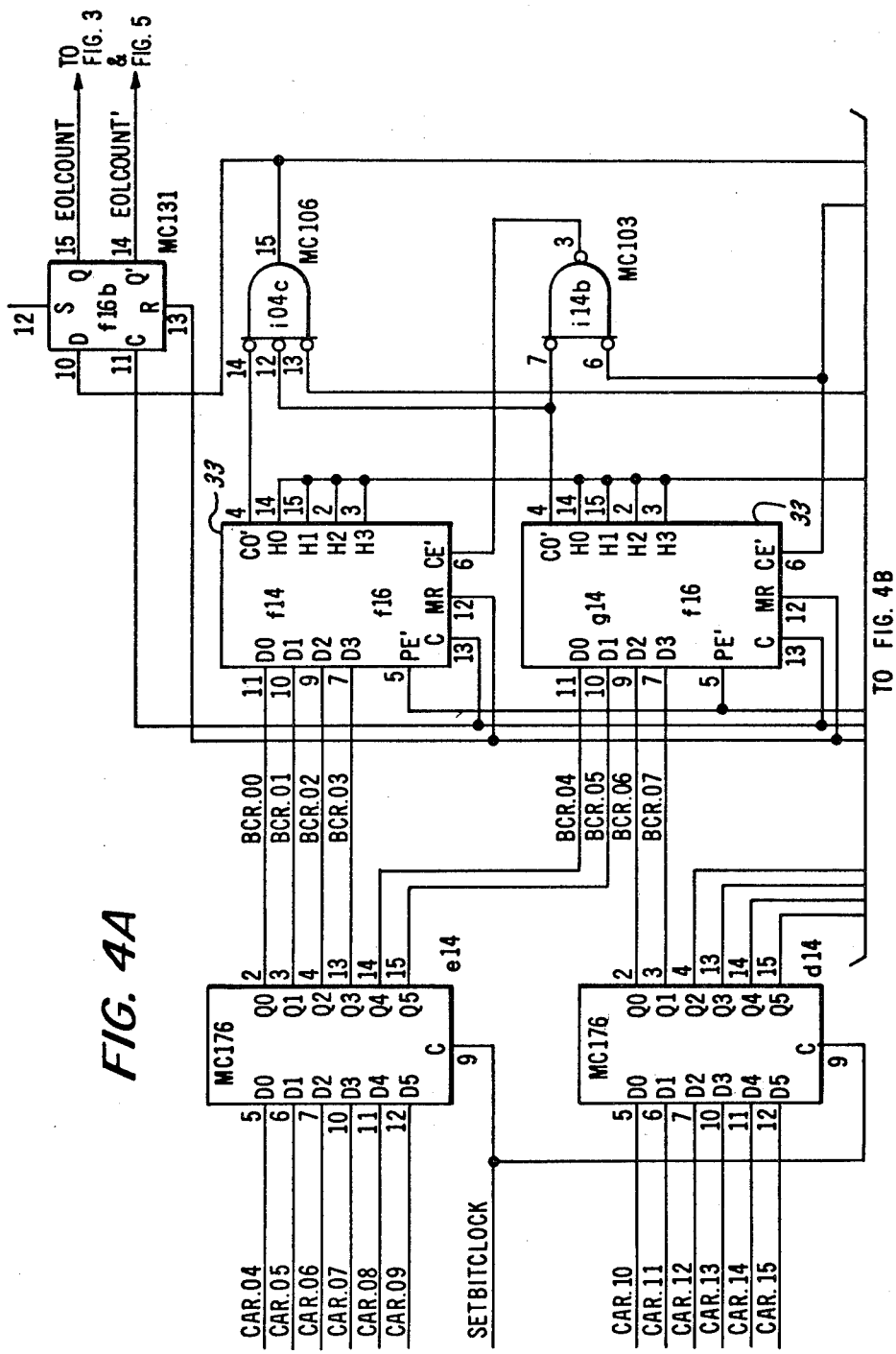
FIGS. 4A and 4B are a schematic diagram of the clock counter.
Figure 4B:
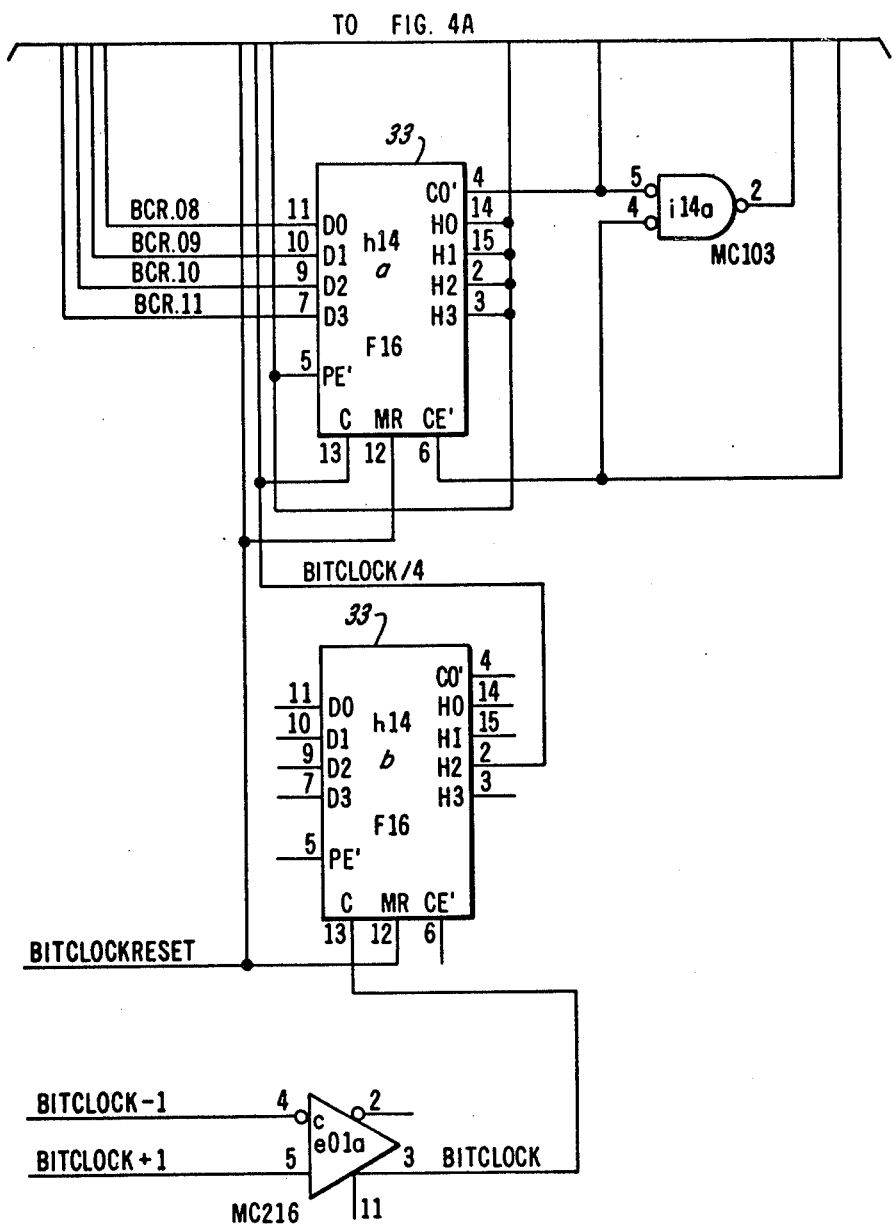

The bit clock, BitClock, is applied through gate e01a of FIG. 4 to the bit counter comprising counter devices h14b, h14a, g14 and f14. The counter is first set to a predetermined value corresponding to the desired number of clocks per scan (in fact, the counter is set to its full count minus the number of clock pulses per scan). This predetermined value is loaded into the counter from a controller through latches e14 and d14. Then, during the scan, the counter is clocked up until it overflows, resulting in the EOLCount signal outputs at flip-flop f16b. The counters are initially reset by the Bit ClockReset signal from gate g06a of FIG. 3.

The end of line count EOLCount is coupled from flip-flop f16b to gates h01a and h01b of FIG. 3, along with the delayed reset 1s50 to produce PUMPUP and PUMP DOWN signals at the outputs of gates h01a and h01b, but only if the system is using facet #0 at the time (the Facet Zero signal is true at the input of gate h02a). Since the ls50 signal occurs at the actual end of scan and the EOLCount signal occurs when the predetermined number of clock pulses have been generated, which may be earlier or later than ls50, the directiom of the PUMPUP and PUMPDOWN signals are variable in duration. Thus, the facet #0 servo sequence is to load the desired count through registers e14 and d14 of FIG. 4, count clock pulses in counter f14, g14, h14a, and h14b, produce therefrom an end of line count indication at flip flop f16b, and finally produce at the output of gate h01a and h01b of FIG. 3 correction signals, PUMPUP and PUMPDOWN, which are used to modify the clock frequency as described and shown in FIG. 2. This FIG. 3 circuit is disabled for all other facets.

Figure 5A:
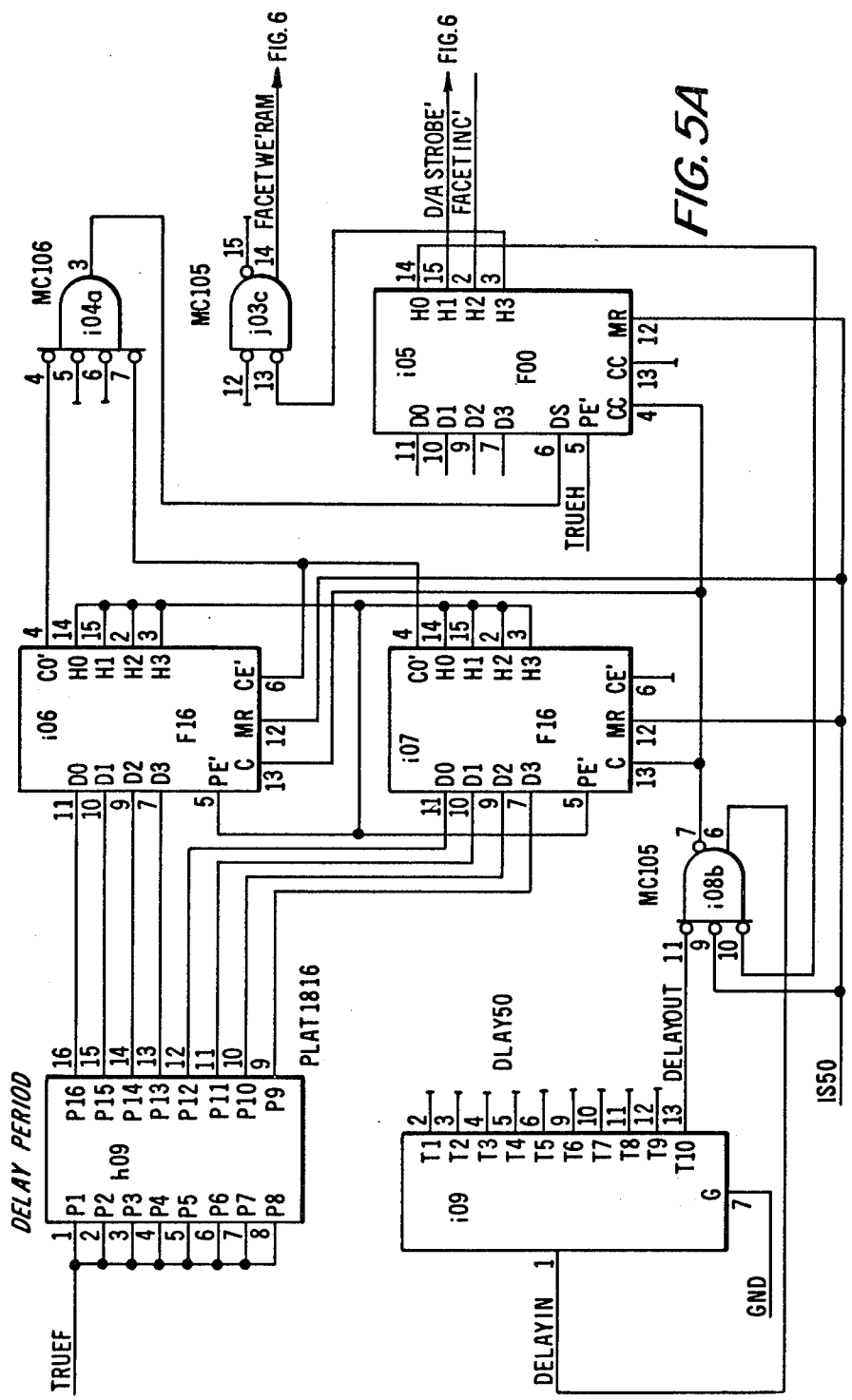
FIGS. 5A, 5B and 5C are a schematic diagram of the circuits used to produce the logic signals for controlling the individual facet corrections.
Figure 5B:
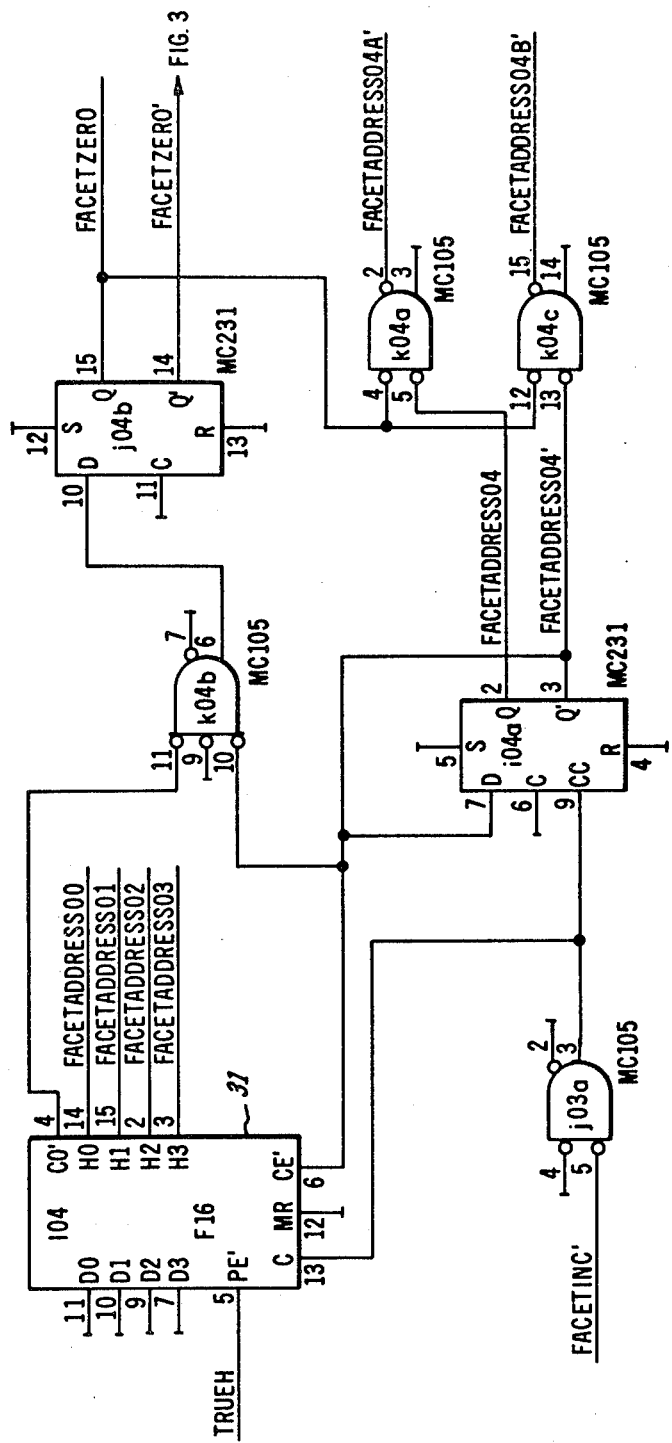
Figure 5C:
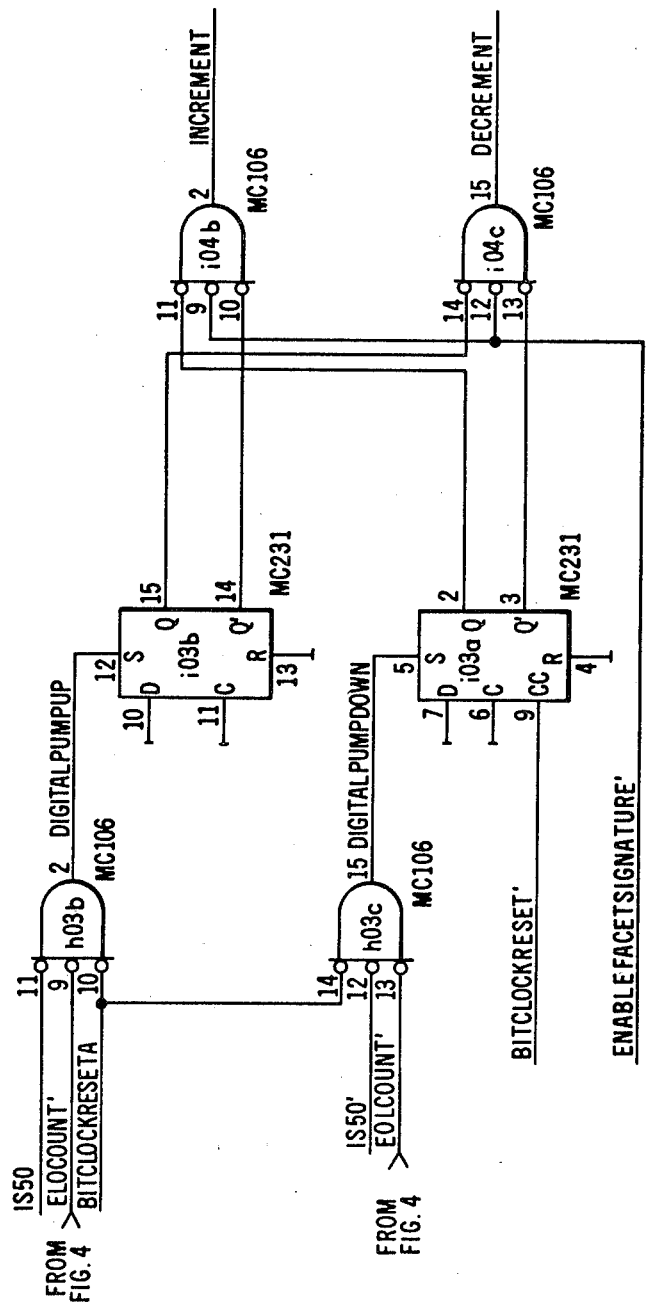

For the correction of each additional facet, a similar circuit is provided as shown in FIG. 5. Gates h03b and h03c receive the count signals EOLCount and produce therefrom correction signals for each facet, Increment or Decrement, which are used to modify each facet error count by one bit.

The facets are numbered by the FIG. 5 counter 104 and subsequent circuitry. A facet clock FacetInc is coupled through gate j03a to provide a clock to the counter 104 and is also coupled through flip-flop j04a to become the least significant output bit signal FacetAddress04 of the thirty-two bit facet counter. The remaining four signals FacetAddress00 through 03 are generated therefrom by counter 104. In addition, FacetAddress04 and the counter 104 carry output are combined in gate k04b and coupled through flip-flop j04b to produce the FacetZero signal used in the circuit of FIG. 3.

Figure 6A:
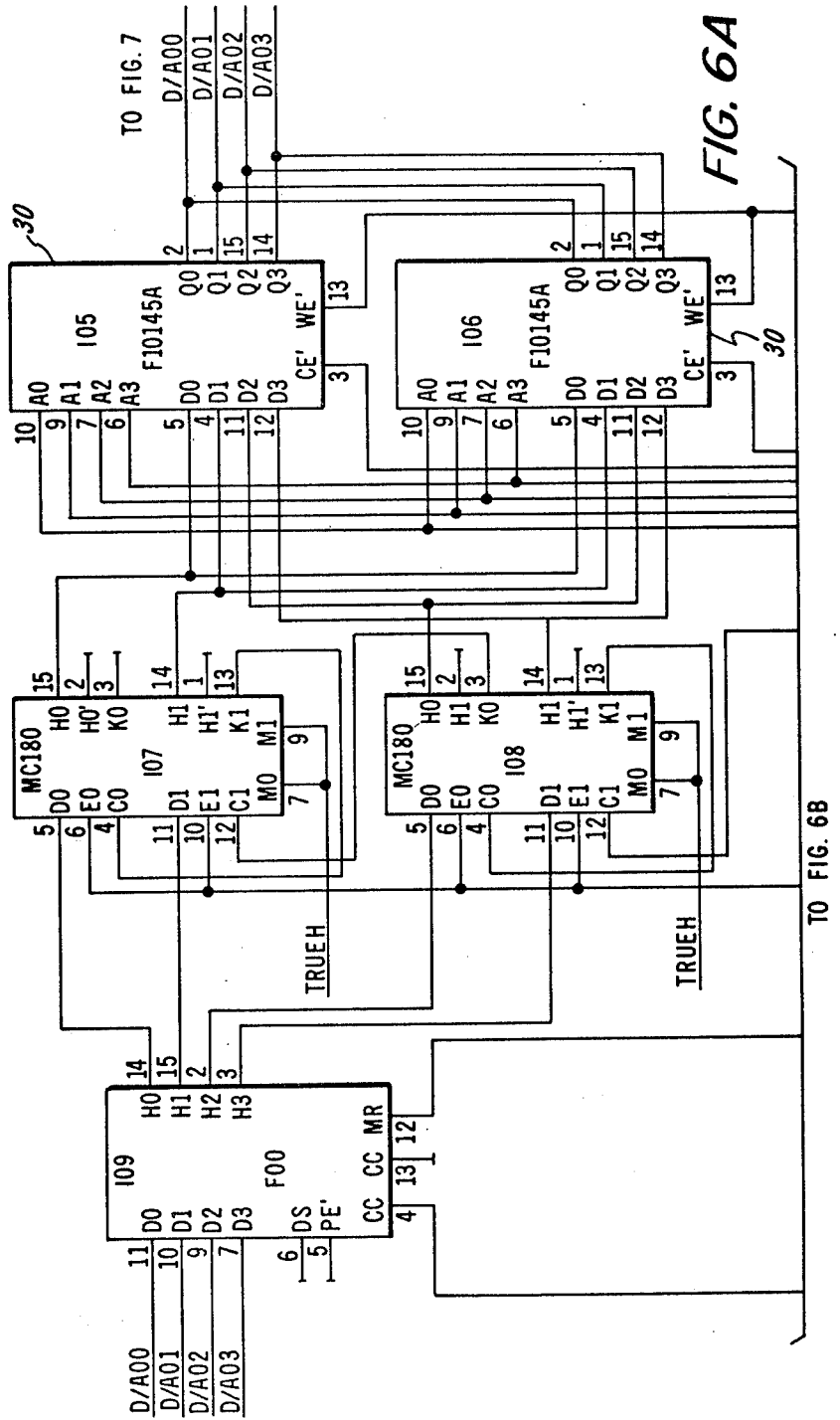
Figure 6B:
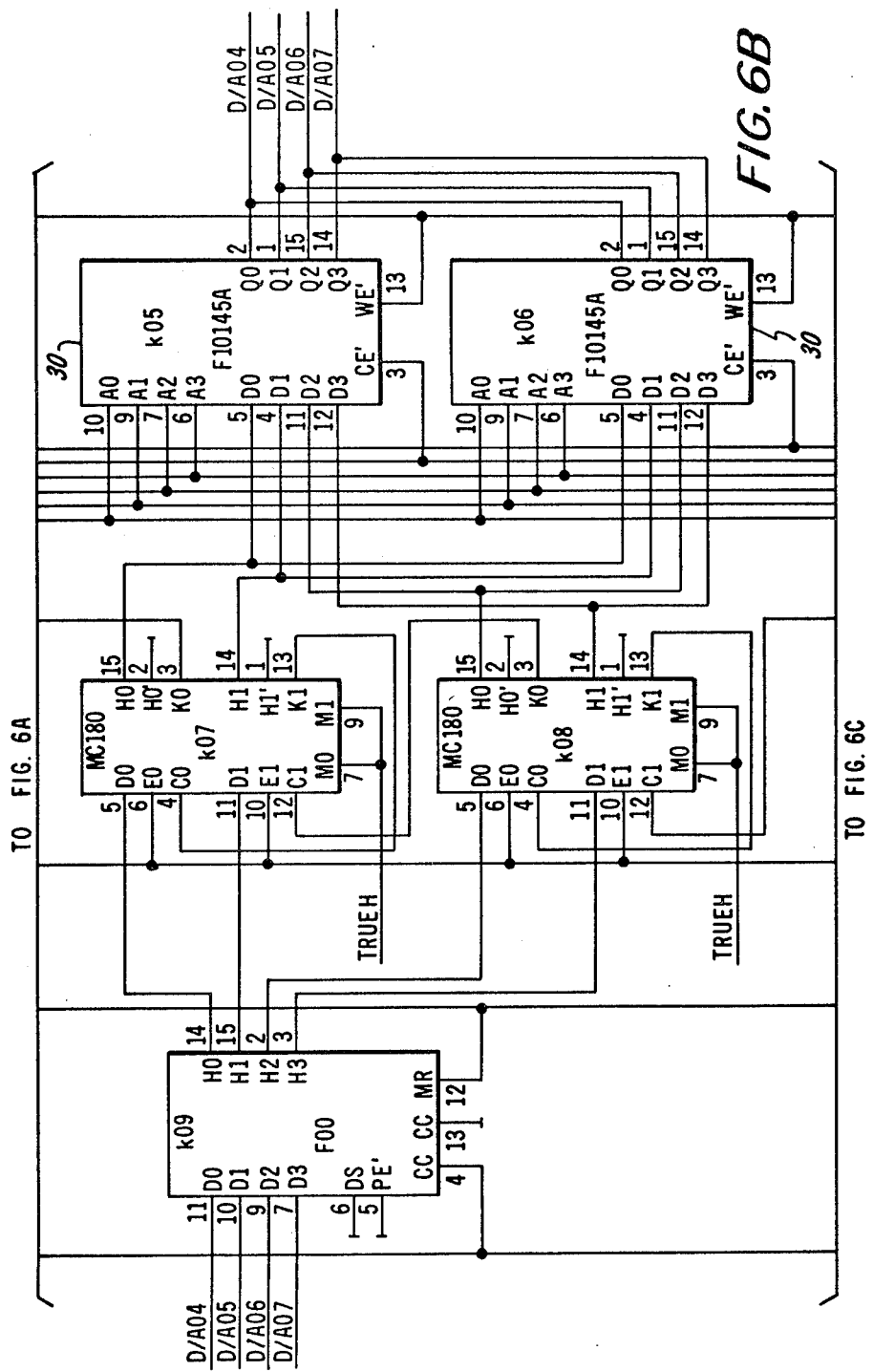
Figure 7:
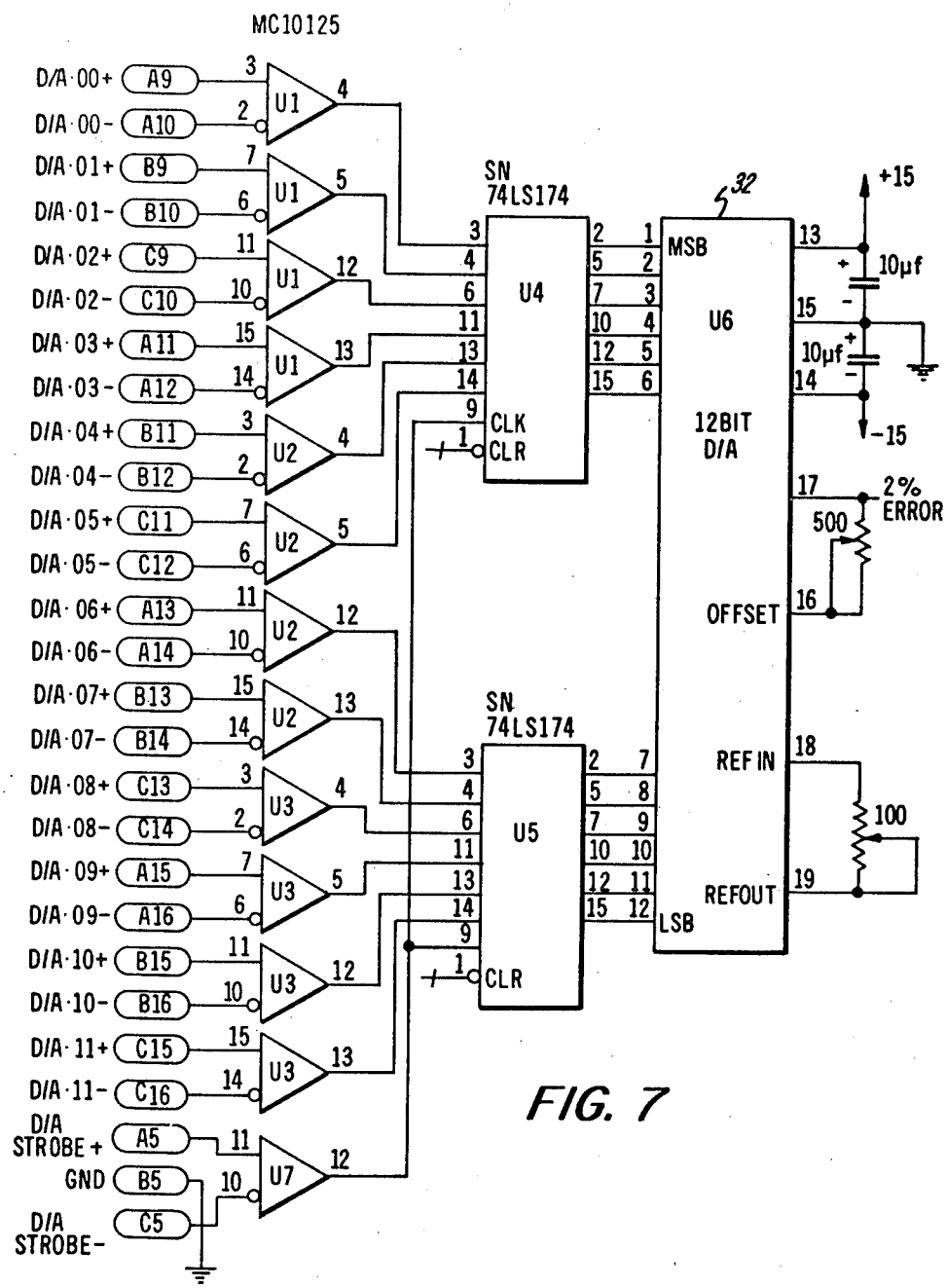
FIG. 7 is a schematic diagram of the digital to analog converter.

FIG. 5 includes a circuit for producing a facet signature RAM write enable signal FacetWE which allows a one bit correction of the RAM of FIG. 6, a digital to analog strobe signal D/AStrobe to allow a change of input for the digital analog converter U6 of FIG. 7, and a facet counter 104 (FIG. 4) clock pulse, FacetInc. These signals are produced by the delayed line sync ls50 which is further delayed by counter i06, i07, to produce output signals from device i05 that are delayed out into the dead time between scans. Counter i06, i07 is set up to a count supplied from device h09 and then counted down by clock pulses generated of delay i09 and gate i08b which are implemented to oscillate to produce pulses. When the counter reaches zero, the carryout is coupled through gate i04a, latch i05 and gate j03c to produce the signals described above.

In FIG. 6, the RAM devices 105, 106, k05, k06, j05, and j06 are addressed by the facet number, FacetAddress00 through 03, and store and output the correction value which is used by the DAC of FIG. 7.

In addition, these values are supplied through registers l09, k09, and j09 to the inputs of ALU devices l07, l08, k07, k08, j07, and j08. Here these values are either incremented or decremented by signals Decrement of Increment to correct each before being re-stored in the RAMs.

FIG. 7 is a schematic of the digital to analog converter U6 which converts the digital output of the RAMs, D/A 00 through D/A 11, coupled through registers U4 and U5, into an analog voltage, 2% ERROR, which is the input to adder 18 of FIG. 2.

The invention is not limited to any of the embodiments described above, but all changes and modifications thereof not constituting departures from the spirit and scope of the invention are intended to be covered by the following claims.

What is claimed is:

1. A circuit for individually correcting the bit clock of a spot scanner for each of a plurality of facets of a polygon comprising:
    clock counter means for determining whether the clock pulse count for each scan is too high, or too low, and for creating a digital correction signal,
    facet counter means for associating each facet with its associated digital correction signal,
    first integrating means for transforming the digital correcting signal for facet number zero into a facet zero analog correction voltage;
    memory means responsive to said clock counter means and addressed by said facet counter means for storing the digital correction signal for each facet other than facet number zero, and responsive to said facet counter means for outputting the digital correction signal for the current facet,
    a digital to analog converter for converting said digital correction signal for the current facet into an analog current facet correction voltage,
    an adder for adding said facet zero correction voltage and said current facet correction voltage, and
    a clock generator, responsive to the adder output for producing pulses at a corrected frequency.

2. The circuit of claim 1 wherein said first integrating means comprises an operational amplifier, a parallel capacitor and an input resistor.

3. The circuit of claim 2 further comprising second integrating means responsive to said digital correction signal for producing a compensating voltage which is applied to the input of said first integrating means to compensate for charge leakage from said parallel 4. The circuit of claim 3 further comprising a start of scan detector and an end of scan detector, both comprising a light sensitive means for determining when the spot passes the start and end of scan points, the output signals of said detectors being used to start and stop said clock counter means and to provide a clock input to said facet counter means.

5. The circuit of claim 4 wherein said clock generator is started by the start of scan signal.

6. In a circuit for generating a stream of clock pulses which are frequency adjusted for facet zero of a scanner polygon, of the type comprising a clock counter means for determining whether the clock generator frequency is matched to the scan time of said facet zero, a first integrator means for adding a correction output from said clock counter means to previously generated corrections, and a variable frequency clock generator controlled by the first integrator means output to produce clock pulses, the improvement comprising:
    facet counter means for identifying each facet,
    memory means addressed by said facet counter means for storing a digital correction signal from said clock counter means for each facet, and for outputting said digital correction signal during each associated facet scan time,
    a digital to analog converter to convert said memory means output to an analog current facet correction voltage, and
    an adder to add said first integrator output to said digital to analog converter prior to the sum being coupled to said clock generator input.

7. The circuit of claim 6 further comprising a second integrator responsive to the facet zero clock counter means output to produce a voltage level output which is coupled to the input of said first integrator means to prevent charge leakage from said first integrator means between facet zero inputs.

8. The circuit of claim 7 further comprising start of scan and end of scan detectors, the outputs of which start and stop said clock counter means and said clock generator, and clock said facet counter means.

9. The circuit of claim 8 wherein said first and second integrator means each comprise an operational amplifier, a series input resistor, and a parallel capacitor.

10. The method of correcting the clock frequency of a spot scanner for each facet of a polygon comprising the steps of:

counting the clock pulses during the duration of each scan, for facet number zero, raising or lowering a facet zero correction voltage for the duration of the polygon rotation if the pulse count is too high or low, to control the facet number zero clock frequency, for the remainder of the facet scans of the polygon, increasing or decreasing a plurality of stored correction voltages, one for each facet, adding said facet zero correction voltage and the one of said plurality of correction voltages which corresponds to the current facet, and using the added voltages to control the frequency of the clock during each scan other then scan number zero.

11. The method of correcting the clock frequency of a spot scanner for each facet of a polygon comprising the steps of:

counting the clock pulses during the duration of each facet scan, for facet number zero, raising or lowering a first correction voltage for the duration of the polygon rotation if the pulse count is too high or low, to control the facet number zero clock frequency, for the remainder of the facets of the polygon, increasing or decreasing the value of a digital word stored in a memory corresponding to a correction voltage for each of the remaining facet scans based on the pulse counts for each associated scan, for each facet other than facet zero, converting the stored associated digital word into a second correction voltage, adding said first and second voltages, and using the resultant voltage sum to control the frequency of the clock pulse generator.

* * * * *